Figure 1:
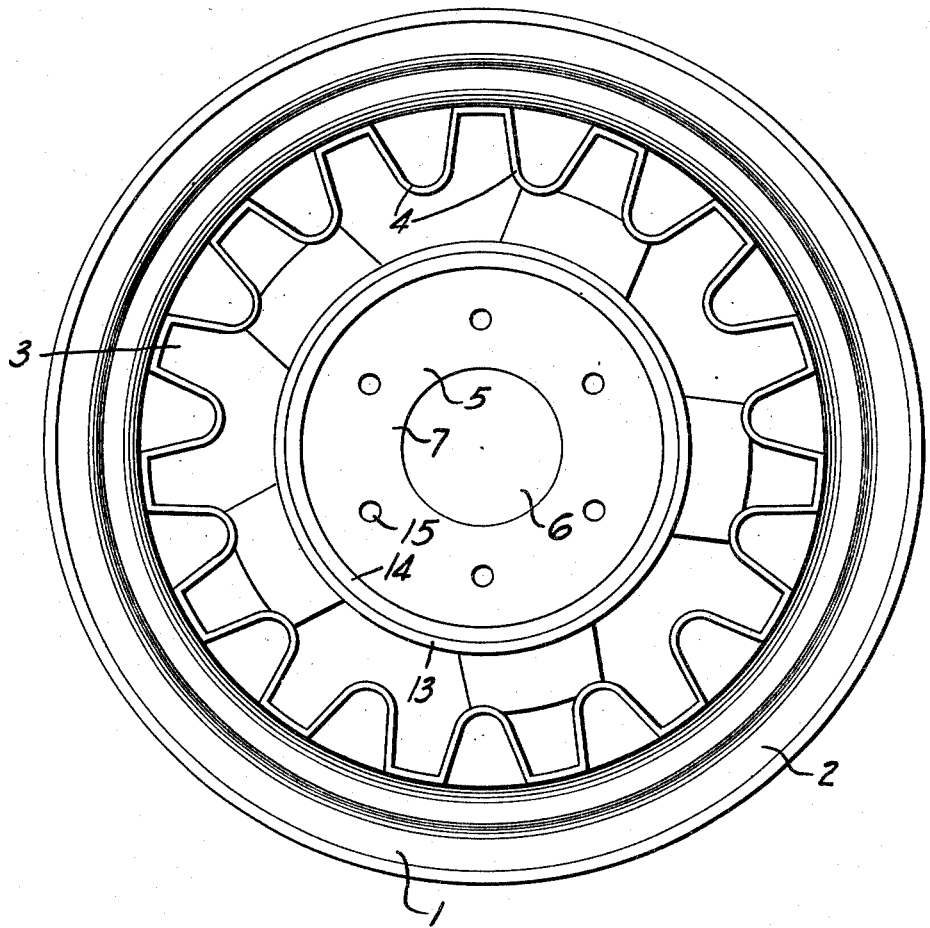

March 15, 1938.  P. M. MILLER ET AL  2,111,292
MOTOR-DRIVEN VEHICLE WHEEL
Filed Sept. 4, 1931   2 Sheets-Sheet 2
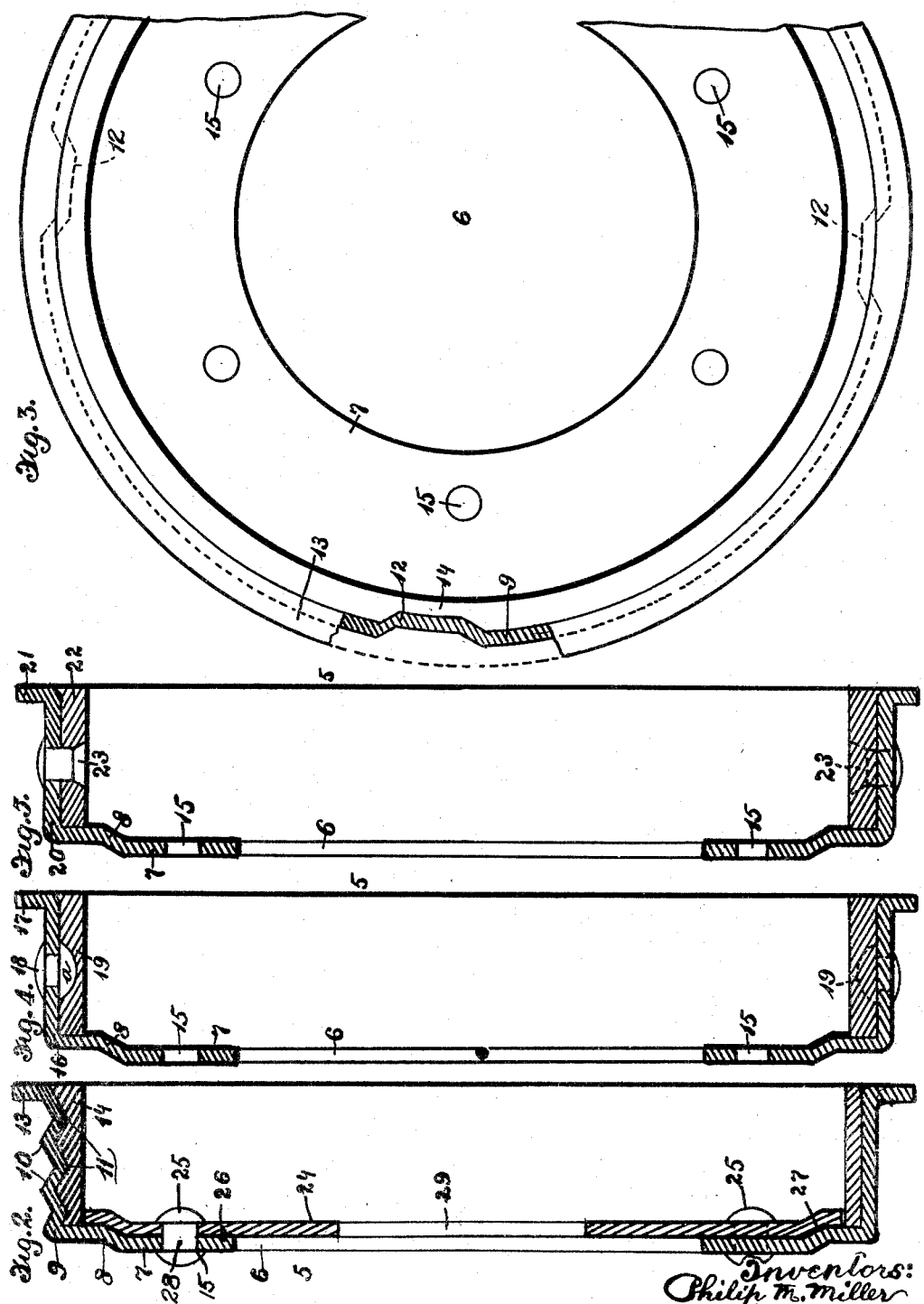

Patented Mar. 15, 1938

2,111,292

UNITED STATES PATENT OFFICE 2,111,292

MOTOR-DRIVEN VEHICLE WHEEL

Philip M. Miller and Richard B. Miller, Cleveland, Ohio, assignors to Bendix Aviation Corporation, South Bend, Ind., a corporation of Delaware Application September 4, 1931, Serial No. 561,180

3 Claims. (Cl. 188—218)

The ordinary or conventional brake drum is attached to the flange of the hub forming a part of the ordinary or conventional vehicle wheel, the point of attachment being to the central portion of the wheel, which is remote from the periphery thereof. The attaching wall of the brake drum is therefore considerably long in diameter, and as a whole, is exceedingly heavy. The material is exceedingly soft owing to containing low carbon that readily yields to premature wear or destruction by friction applied to the flange of the brake drum as a result of contacting therewith by braking mechanism of a vehicle when the latter is in service on the road, whereby the entire braking area on the braking mechanism is frequently required to be repaired, as well as to replace the brake drum in order to have the flange thereof true commeasurable to the trueness of the repaired braking mechanism. Owing to the readily deteriorating effect of the brake drum flange material, thereupon form so-called "high" and "low" spots to the extent such that an uneven surface is formed on the flange, as a result of which the entire braking area becomes ineffective. Another detrimental condition that prevails as a result of employing a soft material brake drum with a diametrically long attaching wall, is that the entire attaching wall becomes warped and thrown out of alignment with the side of the wheel.

As the point of attachment of the brake drum is centrally of the wheel, the periphery of the wheel is separated from the periphery of the brake drum. The periphery of the wheel and the periphery of the brake drum are therefore inefficiently rigid for service with a vehicle on the road, and therefore form undesirable constructions.

On account of the increased speed efficiency of the present motor-driven vehicles and greatly increased traffic, better braking facilities on vehicles are required than heretofore, and therefore the efficiency of the brake drum must commensurate to the efficiency of the braking mechanism of the vehicle, as one construction depends functionally or structurally on the other construction.

Our invention relates to a brake drum peripheral member of light construction, which is strong, inexpensive and durable, provided with a high wear resisting braking member of material harder than the material of the main body thereof, and having heat radiating and resisting means for increasing efficiency therein.

The principal object of our invention is to eliminate the detrimental conditions and defects existing with the present brake drum and wheel peripheral constructions, and to provide a brake drum peripheral member in which greater rigidity can be practically obtained for the periphery of a vehicle wheel when the constructions are fastened together for a united service with the vehicle on the road under load, as well as to embody therein efficient heat radiating means and cause a decrease in weight as compared with the present brake drum construction of the drawn or stamped type, and, particularly, of the cast type, required to take care of a given amount of work to be performed.

Other objects and advantages of the invention will become apparent from the description of the drawings, in which Figure 1 is a side elevation of a wheel embodying the present invention;

Fig. 2 is a cross section in which the braking mechanism engaging member is of efficiently resisting material, such as cast iron mixture or manganese steel or the like high wear composition, cast in a flanged portion of strong sheet metal, such as steel, both members being fastened together as by circumferentially outwardly pressed portions and transversely inwardly pressed portions formed in the flanged portion of the sheet metal, the completed member being separated from a disk member which is also in cross section.

Fig. 3 is a fragmentary side elevational portion of the completed brake drum peripheral body shown in Fig. 2, showing the inner face construction having a portion of the upright flange thereof removed to show a transversely depressed portion in the transverse flange embedded in the material of the cast member of Fig. 2, by which a driving connection is provided therebetween.

Fig. 4 is a construction similar to Fig. 2, in which the cast member is retained in fastening position as by riveting or other members, fixed in the transverse flange of the sheet metal member, previously to molding the cast member therein, the members being embedded in the material of the cast member, by which a smooth brake engaging surface is provided and separation of one from the other is prevented.

Fig. 5 is a construction similar to Figs. 2 and 4, in which the brake engaging member is retained in fastening position under tension or compression of the sheet metal member and by additionally riveting or other means, which means may be eliminated when desired.

Referring now to Figure 1, it will be observed that a vehicle wheel, designated as a whole by the reference numeral 1, includes a rim section 2 adapted to receive a vehicle tire. The rim 2 is supported by a disc 3 having a series of outwardly directed serrations formed therein, and having the edges of the disc 3 flanged as shown at 4 to add strength and rigidity to the rim supporting structure. The disc 3 supports the brake drum structure more clearly described hereinafter.

Referring to the details wherein like characters refer to corresponding parts of the steel sheet metal members 5 having a central opening 6, such as the attaching wall 7 outwardly extended and having a tapered seat 8, in which, as shown in Fig. 2, the transverse flange 9 is circumferentially corrugated as shown in transverse, at 10 and 11, having radially outward ribs for the purpose of strengthening the construction and efficiently radiating heat generated therein and radially inward ribs for strengthening the construction and engaging with the brake engaging member which will hereinafter be described, and the transverse flange 9 is depressed, as shown in Fig. 3 at 12 to provide means of preventing, in connection with the means of the ribs 10 and 11, circumferential and lateral separation of the sheet metal member from the brake engaging member. With the inner side of the transverse flange 9 is integral an upright flange 13 adapted for engagement with a member of the braking mechanism. In the inner face of the transverse flange 9 is molded a member 14 which is of cast iron mixture, the consistency of which being different from the material of the steel sheet metal member 5, or other material having high wear resisting qualities to form an efficient brake engaging member, such as manganese steel or similar composition. In the wall 7 are openings 15 for engagement with means of vehicle wheels, herein not shown, to constitute a component member adapted for engagement with braking mechanism of the vehicle.

In Fig. 3 the transverse flange 16 is provided with an upright flange 17 which is for engagement with a member of a braking mechanism. In the transverse flange are fixed members 18 having a head radially projected to form means a embedded in the material of the ring member 19 which is cast and molded or spun in the inner face thereof, for preventing separation of one from the other. The members may be of any number and are arranged so that the heads a are not passed through the material of the ring member 19 in order to provide a smooth brake engaging surface thereon. The material of the member 5 is steel sheet which is suitable for rolling, drawing or stamping, and the material of the ring member 19 is cast iron mixture which may be replaced by manganese steel or other high wear resisting material to provide an efficient brake engaging surface.

In Fig. 4 the transverse flange 20 is provided with an upright flange 21 for engagement with a member of braking mechanism. A ring 22 of an outer diameter larger than the inner diameter of the transverse flange 20 by an amount suitable to provide a pressed fit is laterally pressed into the inner face thereof, thereby having the flange in tension and the ring under compression. If required, the flange and ring may be riveted together by soft rivets 23, the inner heads of which are countersunk in the material of the ring which is of cast iron mixture or manganese steel, or other high wear resisting material adapted to form an efficient brake engaging surface.

The steel sheet metal member 5 may be formed by stamping or drawing means in the well known manner, but we prefer to produce a highly efficient member of material which is rolled by the method described in our application, Serial No. 546,270, filed June 23, 1931, having a relatively short attaching wall and a light transverse flange for carrying a high wear resisting material ring. The relatively short attaching wall is adapted for engagement with the inner portion of spokes constituting the periphery of a wheel at a point which is remote from the central part but in close proximity to the periphery thereof, for the explicit purpose of strengthening the periphery of the wheel and brake drum periphery and rendering rigidity to both constructions.

With the completed brake drum peripheral members we provide means whereby the constructions of our pending applications may be equipped for the purposes, hereinbefore described, to form light, strong, inexpensive wheels and wheel members of malleable iron or steel cast material, carrying an efficient brake drum member for engagement with braking mechanism.

In addition to the employment of the completed brake drum peripheral member with the inner face of the inner ends of wheel spokes, a disk 24, shown in Fig. 1, is provided, in which are rivets 25 engaged in openings in the wall 26 thereof, the rivets passing laterally for the purpose which will hereinafter be described. When the peripheral portion 27 of the disk is in contact with the portion 8 of the member 5 the free ends of the rivets 25 are projected from the outer face of the wall 7 and are riveted to form heads thereon for uniting the members together, by which the disk is in rigid engagement with the member. The disk 24 is interchangeably employed with the peripheral member when it is required to mount the brake drum on the hub of a vehicle instead of applying the peripheral member to the inner portion of the spokes of the wheel as hereinbefore described.

We are aware that the detail means of manufacture of the constructions may be varied considerably without departing from the spirit of our invention, and, therefore, we claim our invention broadly, as set forth in the appended claims.

Having thus described our invention, we may make variations, modifications and substitutions without departing from the scope of the claims, and what we desire to secure by Letters Patent is:

1. In combination with a vehicle wheel, a brake drum peripheral member comprising a relatively short attaching wall and a transverse flange, circumferential, radially extended portions formed in said transverse flange which is depressed transversely to distort the outline of said radially extended portions, a brake engaging member molded in the inner face of the transverse flange to form a part thereof, and openings in the attaching wall of the peripheral member for engagement with locking bolts to fasten the peripheral member to the vehicle wheel.

2. In combination with a vehicle wheel, a brake drum peripheral member comprising an attaching wall having openings and a transverse flange having an integral upright flange, the transverse flange being corrugated to provide circumferential, radially extended portions and being transversely depressed to provide engaging means, a brake engaging member fastened in the inner face of the transverse flange to prevent circumferential and lateral creeping therebetween.

3. In combination with a vehicle wheel, a brake drum peripheral member comprising a vertical wall integral with a transverse flanged member, radially extended portions provided in the transverse flanged member, the said portions being distorted to provide radially extended engaging means, and a brake engaging member pressed in the inner face of the said radially extended portions and radially extended engaging means thereby preventing separation of one from the other.

PHILIP M. MILLER.
RICHARD B. MILLER.